Oct. 23, 1956 D. W. FENTRESS 2,767,740
TUBING STRUCTURE AND METHOD OF MAKING SAME
Filed April 20, 1953 2 Sheets-Sheet 1
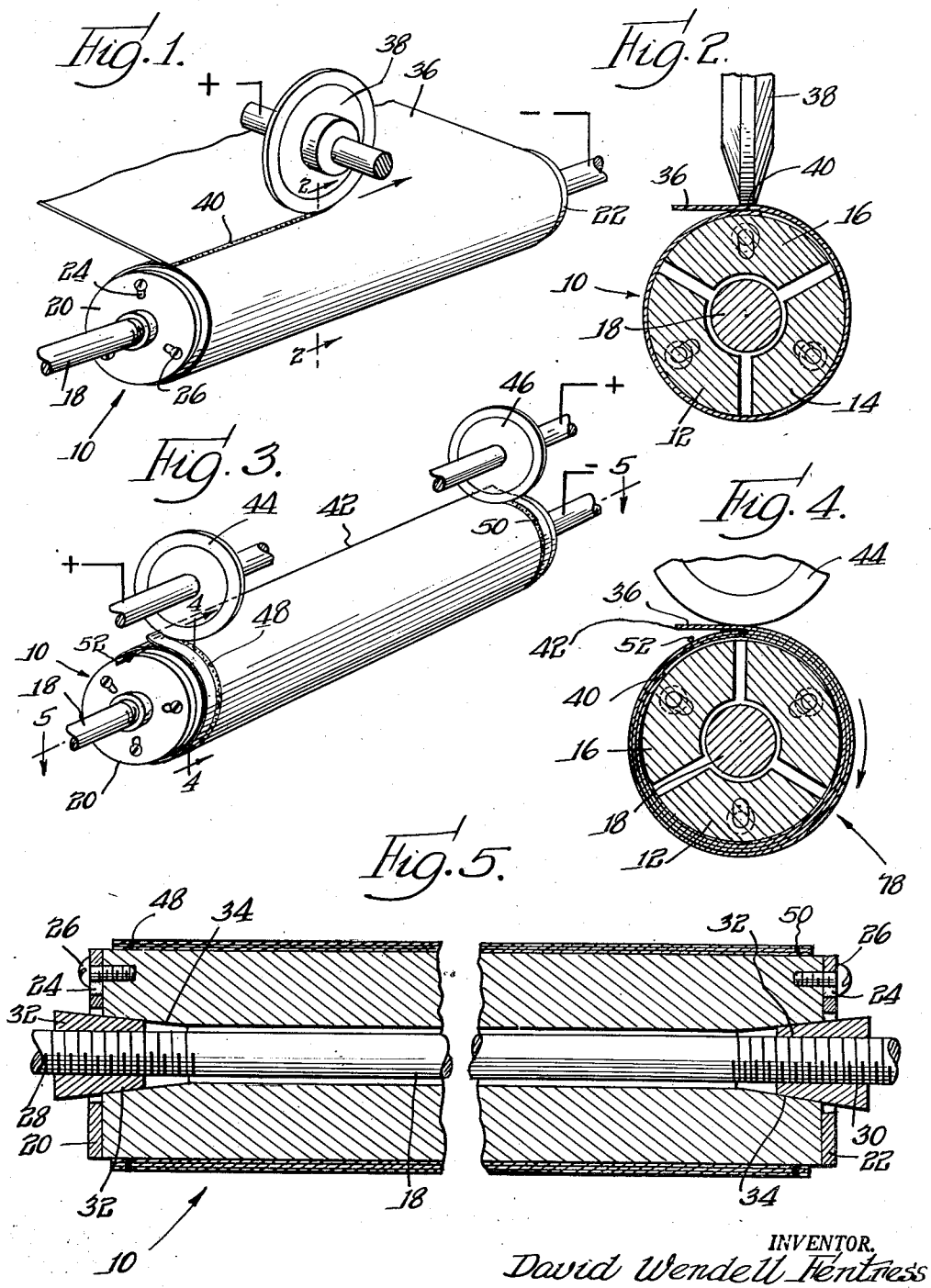
INVENTOR.
David Wendell Fentress
BY
Moore, Olson & Trexler
Attys.

Oct. 23, 1956  D. W. FENTRESS  2,767,740
TUBING STRUCTURE AND METHOD OF MAKING SAME
Filed April 20, 1953  2 Sheets-Sheet 2
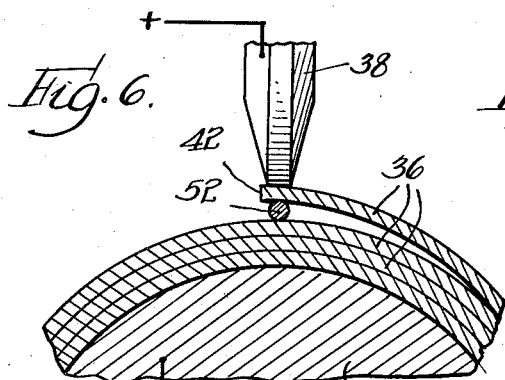
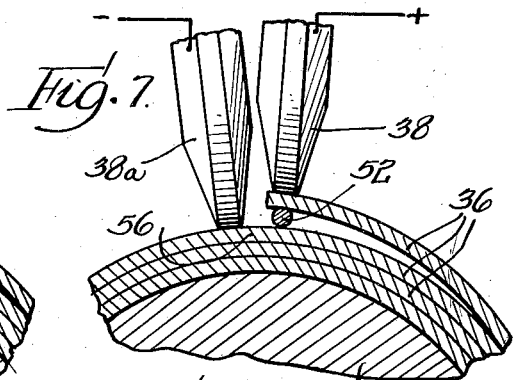
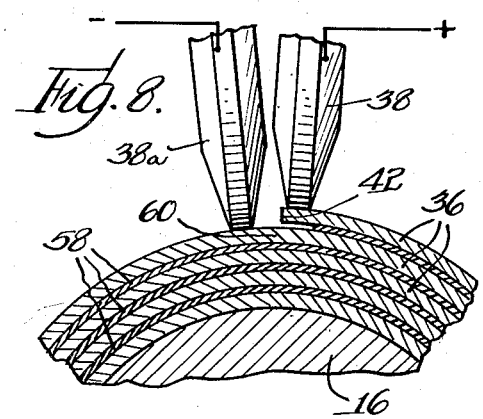
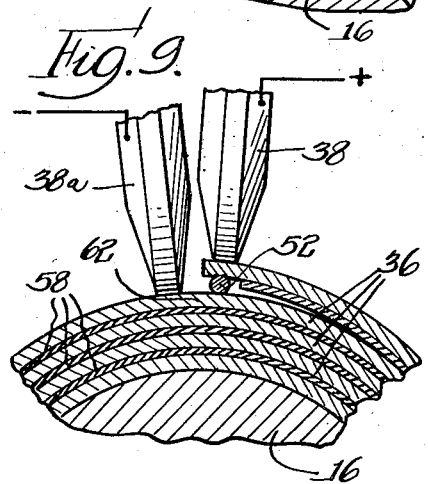
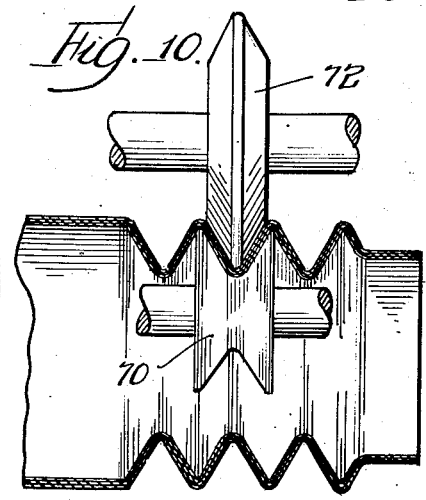
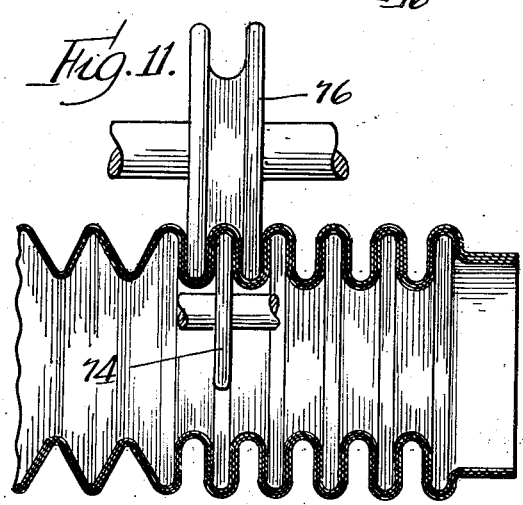
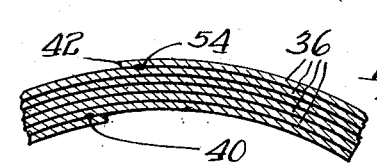
INVENTOR.
David Wendell Fentress
BY
Moore, Olson & Trexler
Attys.

United States Patent Office 2,767,740
Patented Oct. 23, 1956

2,767,740

TUBING STRUCTURE AND METHOD OF MAKING SAME

David Wendell Fentress, Barrington, Ill., assignor to Flexonics Corporation, a corporation of Illinois Application April 20, 1953, Serial No. 349,751

14 Claims. (Cl. 138—51)

This invention relates to tubing structures, and to means and methods for effecting the fabrication thereof, and concerns particularly tubing of the flexible or corrugated type fabricated from spirally wrapped metal sheet.

It is an object of the invention to provide a flexible or corrugated tubing structure of improved construction and improved operating characteristics, and to provide improved and readily operable means and methods for effecting the tubing fabrication.

More specifically stated, it is an object of the invention to provide an improved corrugated tubing of spiral laminated construction, having a high degree of flexibility in relation to its strength and resistance to fluid bursting pressures, and to provide improved fabricating methods therefor.

Further objects of the invention are to provide an improved fabricating method for corrugated tubing structure of the foregoing type, wherein the tubing will have requisite fluid tightness; and wherein the tubing will be so reinforced that it will be durable in service, and may be corrugated or convoluted without undue distortion of the wall surfaces, while still retaining a high degree of flexibility.

Various other objects, advantages and features of the invention will be apparent from the following specification when taken in connection with the accompanying drawings, wherein certain preferred embodiments of the invention are set forth for purposes of illustration.

In the drawings, wherein like reference numerals refer to like parts throughout:

Fig. 1 is a perspective view, somewhat diagrammatic in form, illustrating means and methods for effecting the initial fabricating step in the construction of tubing in accordance with the present invention, and in accordance with one preferred embodiment thereof;

Fig. 2 is an enlarged transverse sectional view through the welding support arbor and associated parts, as illustrated in Fig. 1, and taken as indicated by the line 2—2 thereof;

Fig. 3 is a view similar to Fig. 1, but illustrating a further step in the fabrication of the tubing;

Fig. 4 is an enlarged transverse sectional view through the arbor and associated parts, taken as indicated by the line 4—4 of Fig. 3;

Fig. 5 is an enlarged partial section through the structure of Fig. 3, taken as indicated by the line 5—5 thereof;

Fig. 6 is an enlarged detail view, illustrating a further step in the method of fabricating the tubing, in accordance with the present invention, and in accordance with one embodiment thereof, employing a wire filament;

Fig. 7 is a view generally similar to Fig. 6, but illustrating a modified welding method employing the use of dual roller electrodes;

Fig. 8 is a view, similar to Figs. 6 and 7, illustrating a welding method, employing the use of insulation for localizing the welding operation;

Fig. 9 is a view, also similar to Fig. 6, but combining the structures of Figs. 7 and 8;

Figs. 10 and 11 are views illustrating successive final steps in effecting the corrugating of the tubing, in accordance with the embodiment selected for illustration; and Fig. 12 is a partial illustrative view of the completed laminated tubing wall.

This application is a continuation-in-part of my prior copending applications, Serial No. 711,351, filed November 21, 1946, entitled "Tubing Structure and Method of Manufacture," now Patent No. 2,663,324; and Serial No. 786,407, filed November 17, 1947, entitled "Method of Making Tubing Structure," now Patent No. 2,635,330, April 21, 1953.

In certain instances tubing structures are required having a high degree of flexibility in respect to their strength and resistance to bursting pressures. In such instances the use of tubing having a laminated wall structure is indicated; the laminated wall having a strength or resistance to bursting pressures which is roughly proportional to the over-all thickness of the composite wall, whereas the rigidity or resistance to flexibility of the tubing is likewise only a first power multiple of the rigidity of each lamination. If the tubing is constructed of a single wall of increased thickness, the rigidity varies roughly as the cube of the wall thickness so that in the case of tubing having a relatively thick wall a structure deficient in the necessary flexibility may result.

While the use of laminated tubing is thus desirable in many instances, difficulty has been encountered in the production of satisfactory fluid-tight but adequately flexible laminated tubing, particularly in connection with the fabrication and corrugation thereof from spiral laminated sheet. In accordance with the present invention satisfactory and readily operable means and methods are provided for fabricating the laminated tube wall, and for effecting the reinforcement and securing thereof without unduly impairing flexibility, and in such manner that the tubing may be satisfactorily corrugated with such type of convolution as may be desired, without distortion or rupture of the tube wall surfaces.

Referring more specifically to the drawings, and first to the embodiment illustrated in Figs. 1–6, in Fig. 1 there is illustrated a support and welding mandrel 10, the detailed construction of which is best shown in Figs. 2 and 5. As shown, the mandrel or arbor is composed of three expansible sections 12, 14 and 16 mounted upon a central shaft 18 which may be supported and rotatably driven in any desired manner by means not shown. A pair of end plates 20 and 22 is provided at the ends of the mandrel, these end plates being provided with radial slots 24 adapted to receive screws 26 carried by the several mandrel sections. The screws are sufficiently loose so that radial shifting of the mandrel sections in respect to the end plates is thus permitted, the outward movement of the sections being limited by the engagement of the screw shanks against the ends of the plate slots.

The shaft 18 is provided with right and left-hand threaded portions 28 and 30, Fig. 5, which portions are cooperable with a pair of threaded cone members 32 adapted to slide against conical surfaces 34 suitably formed in the opposite ends of the bores of the mandrel sections.

It will be seen that upon relative rotation of shaft 18 in respect to the mandrel, the several sections thereof will be radially expanded to a predetermined size determined by the length of the slots 24, or permitted to collapse to a smaller size to facilitate the removal of a completed cylinder work piece from the mandrel. Normally and during the operations presently to be described, the shaft 18 and the several mandrel sections move as a unit, if and as the mandrel is rotated.

Referring further to Figs. 1 and 2, in fabricating the tubing a sheet 36 is first drawn from a suitable supply source and around the expanded mandrel 10 by the rotation thereof. The sheet 36 is formed of suitable material, such as metal, of which the tubing is to be fabricated, and has a length transversely of the mandrel axis determined by the diameter of the tubing to be formed and the number of laminations desired, and a length axially of the mandrel determined by the length of the tubing desired. The length of the mandrel 10 is likewise determined by the length of the tubing to be formed, and the expanded diameter thereof determines the normal or mean diameter of the tubing prior to the corrugating operations.

Tubing structures of various lengths may be fabricated in accordance with the invention to provide either relatively long conduits or relatively short bellows, as may be desired; and it is to be understood that the term "tubing" as herein used denotes any desired length including relatively short structures sometimes referred to as bellows.

After slightly in excess of one complete convolution of the metal sheet has been drawn onto the mandrel, as shown in Fig. 2, a welding roller 38 is engaged against the overlapped seam, the welding roller having been maintained withdrawn from the mandrel during the initial winding operation of the metal sheet, as will be understood. As the welding roller is shifted longitudinally of the mandrel, as indicated by the arrow in Fig. 1, and welding current applied between the welding roller and the mandrel, a longitudinal seam weld will be provided extending lengthwise of the tubing, as indicated by the reference number 40. Suitable means may be provided for mounting the welding roller, and for shifting the roller longitudinally of the mandrel, or for shifting the mandrel longitudinally in respect to the roller, and for applying the welding current to the roller and to the mandrel, in accordance with standard welding practice.

After the longitudinal weld 40 has been formed, the welding roller 38 is withdrawn and rotation of the mandrel structure resumed so as to further wind the sheet 36 upon the mandrel into several superimposed spiral laminations, as many as desired. The length of the sheet 36 is such that the end 42 thereof will slightly overlap the welded seam 40 in the finished tubing. During the final revolution of the mandrel, a pair of welding rollers 44 and 46 is engaged against the sheet at the opposite ends of the mandrel, and welding current applied, so as to form circular seam-resistance welds 48 and 50 between the sheets at the opposite ends of the tubing. The rollers 44 and 46 may be continuously engaged against the sheet both during the initial winding as shown in Fig. 1, and during the subsequent winding, if desired, and if the rollers are power driven they will aid in winding the sheet upon the mandrel. For economy it is desirable that the welding current only be applied during the final revolution of the mandrel to form one complete circular seam-resistance weld at each tubing end.

In Figs. 6-9 means and methods are illustrated for effecting the seam welding of the outermost tubing laminations, after the spiral wrapping operations, by means of a weld which penetrates only the outermost laminated walls. By this means a seam weld for the outer laminations is provided, for insured fluid-tightness and maximum stability of the tubing, while at the same time retaining the high flexibility provided by freely slidable laminated walls.

In Fig. 6 an arrangement is shown for accomplishing the selective welding of the outermost laminations into a longitudinal seam weld utilizing principles analogous to those employed in projection welding. In this instance a wire 52 is laid beneath the final lamination closely juxtaposed to the strip end 42, the wire preferably being positioned by means of suitable holding means formed on the mandrel end plates. The wire 52 is preferably laid in position before the circular end welds 48 and 50 are formed, so that the end welds anchor and hold the wire in position.

As the welding roller 38 is moved longitudinally along the tube sheet over the wire 52, and welding pressure and current applied between the roller and the mandrel, the high resistance contact between the wire and the tube sheet will produce heating resulting in the softening of the wire which under the pressure of the electrode will become formed into a longitudinal, electrical resistance, seam weld 54, Fig. 12, between the outermost tube laminations; the weld, however, being localized to the outermost laminations directly contacted by the wire.

The wire 52 is shown in the drawings in exaggerated size for illustrative purposes. As will be understood, the purpose of the wire is not to add metal but to localize the heating area between the wall laminations. The wire may preferably be very small, sufficient only to maintain proper spacing between the parts, and after the completion of the weld becomes substantially indistinguishable, and a part of the metal sheet material.

In Fig. 7 a welding method is illustrated for effecting the welding of the outermost or final tubing lamination, by means generally similar to the arrangements provided in Fig. 6; but wherein the welding is effected by a pair of cooperative and juxtaposed welding rollers, as indicated at 38 and 38a, between which the welding current is applied.

As in the case of the structures defined in Fig. 6, the inserted wire 52 (illustrated in exaggerated size) localizes the welding to the outermost lamination by producing a high resistance contact at the selected location where the welding is desired. In Fig. 7, however, the current path is through the inserted wire, and then essentially through the immediately adjacent tubing body, as indicated at 56, rather than into the mandrel 16, thus minimizing the tendency for any welding to occur except for the anchorage of the outermost tubing lamination. By this means the provision of a localized weld for the outer tubing lamination, as indicated at 54 in Fig. 12 is further insured.

In Fig. 8 an arrangement is disclosed for effecting the selective welding of only the outermost tubing laminations by means of dual cooperative electrodes, preferably coupled with the use of insulating means for localizing the welding operations to the desired work areas.

As shown in Fig. 8, a pair of roller electrodes 38 and 38a is in this instance preferably employed, the mandrel being insulated and the roller electrodes being connected, respectively, to the opposite poles of the welding transformer, as diagrammatically indicated. Also, as shown in Fig. 8, a layer 58 of insulating material is disposed between the various laminations 36 of the tube sheet, the layer 58 preferably forming a complete covering or barrier wall between the tube sheet laminations except immediately adjacent the sheet end 42. The layer 58 may comprise a separate sheet of insulating material superposed in respect to the tube sheet and spirally wrapped therewith, or it may comprise an insulating coating painted or otherwise physically or chemically applied to the sheet except adjacent the immediate sheet end 42. As in the case of the inserted wire 52, previously described, the insulating coating or material 58 is illustrated in exaggerated thickness in the drawings. In practice the insulation coating will preferably be as thin as practicable, of a thickness sufficient only to resist the welding potential, as will be understood.

The provision of the insulation, as above set forth, in combination with the cooperative roller electrodes 38 and 38a, localizes the current path between the electrodes substantially to the area indicated by the reference numeral 60, avoiding transmission of the welding current through juxtaposed tubing laminations except along the seam weld to be formed, thus insuring the provision of a discrete single lamination weld, as shown at 54 in Fig. 12.

In Fig. 9 an embodiment is illustrated for effecting the selective welding of the outermost tubing lamination, which embodies the principles of both Fig. 7, and of Fig. 8.

As shown, in this instance there is provided the inserted wire 52, as previously described, and also the insulating coating or sheet 58, disposed between the several tubing laminations.

As the welding current is transmitted between the welding electrodes, the inserted wire 52 provides a higher resistance contact at the desired point of the weld, and the insulation coating localizes the welding current to the path substantially as indicated by the reference numeral 62; the inserted wire and insulation thus cooperating to insure the production of a discrete and localized weld for the outermost tubing lamination, as indicated at 54 in Fig. 12, as in the embodiments previously described.

As the welding rollers 38 and 38a are moved longitudinally of the sheet end, and the welding current applied, a weld as indicated at 54, Fig. 12, will be formed longitudinally between the outermost sheet laminations, the close juxtaposition of the electrodes and the wire and insulating material 58 cooperating to localize the weld between the outermost laminations, leaving the remaining tube laminations free for flexing in accordance with the principles of the present invention.

After the welding operations the tubing may be removed from the welding and support mandrel, by effecting the collapse thereof as previously described.

The selective welding and tube forming operations, as hereinbefore described, have particular applicability to the corrugated flexible tubing, wherein maintained fluid-tightness, but with a high degree of flexibility, are required.

In accordance with the invention, the corrugations, either helical or annular, may be formed in the welded tubing in any desired manner. As illustrated in Figs. 10 and 11 the corrugations in the particular embodiment shown are annularly formed by a plurality of sequential rolling operations between suitably formed shaping rollers. As shown, the tubing is first subjected at spaced intervals to the action of a pair of complementary forming rollers 70 and 72 disposed internally and externally of the tubing whereby to form sequentially, a plurality of annular corrugations or convolutions in the tubing. To effect the further shaping of the convolutions into the desired form, they may be subjected to the action of further forming rollers 74 and 76, as shown in Fig. 11, whereby to form the convolutions into the desired final shape. As previously indicated, the means for forming the convolutions may take various specific forms, for example as shown in Dreyer Patent 1,879,663, dated September 27, 1932, or as shown in Fentress Patent 2,306,018, dated December 22, 1942.

The details of the completed tubing wall as welded by the means and methods of the present invention are illustrated in Fig. 12. It will be seen that a tubing wall having a plurality of selectively welded spiral laminations is provided. The longitudinal seam weld 40 extends lengthwise of the entire tubing and forms a fluid seal extending lengthwise of the entire tube so that the spiral wall structure is positively sealed against fluid leakage. However, it will be seen that this weld is formed only between the two innermost wall thicknesses or laminations whereby the weld imparts only a minimum of rigidity to the structure. Similarly the longitudinal seam weld 54, imparting a further positive seal against fluid leakage, is likewise localized between the two outermost wall thicknesses or laminations, whereby this weld likewise imparts only a minimum of rigidity to the structure. The remaining laminations, except for the extreme innermost and outermost pairs, are free to slide relative to each other during the formation of the convolutions, thus eliminating the building up of internal stresses, and the resistance to convolution formation, which would result with a similar wall thickness composed of one piece. Also, the laminations are free to slide relative to each other during the flexing of the tube in service, permitting a high factor of flexibility and fatigue life.

The circular seam-resistance welds 48 and 50 pass through all laminations and provide a secure holding means for anchoring the tubing walls together at the tubing ends. These welds, however, are beyond the zone of flexing and hence do not interfere with the shifting of the tube walls during the flexing movements.

The several welds, as heretofore discussed, provide a sufficient and firm anchorage for the tubing walls so that no misalignment or unwanted distortion thereof takes place during corrugating operations, regardless of the specific type of corrugating means which may be employed. By this means a tubing structure is produced of maximum strength, maximum flexibility, and with accurately formed corrugations or convolutions, to provide a resulting finished product of maximum efficiency which will maintain itself in alignment and flex freely in use.

While in Fig. 12 the welds 40 and 54 are juxtaposed, viz., are disposed on the same tube wall vicinity, it is within the contemplations of the invention that the weld 54 may be diametrically disposed in respect to the weld 40, at the location designated by the arrow 78 in Fig. 4. This result may be secured by controlling the length of the tube sheet, in respect to the diameter of the tubing being formed, so that the tube end 42 will assume a diametrical positioning in respect to the initial weld 40; and this diametrical disposition of the inner and outer welds 40 and 54 may in some instances be desired so as to minimize any tendency for the tubing to assume a curvature or set during the corrugating operation.

It is obvious that various changes may be made in the specific embodiments set forth, and in the method steps stated, without departing from the spirit of the invention. The invention is accordingly not to be limited to the specific structures and methods shown and described, but only as indicated in the following claims.

The invention is hereby claimed as follows:

1. A tubing structure comprising a sheet wrapped upon itself to provide a plurality of superposed spiral laminations, the outer laminations being welded together by weld means extending longitudinally of the tubing, and inner laminations disposed radially within the weld means being free for relative sliding movement, and a spiral substantially continuous layer of electrical insulating material interposed between substantially all of the laminations and terminating in the vicinity of but spaced from said weld means.

2. A tubing structure comprising a sheet wrapped upon itself to provide a plurality of superposed spiral laminations, the outer laminations being welded together by weld means extending longitudinally of the tubing, said weld means including a filament of metal interposed between and welded to lapped portions of the outer laminations for localizing the heating area and resultant welding to the outermost laminations, and inner laminations disposed radially within the weld means being free for relative sliding movement.

3. A tubing structure comprising a sheet wrapped upon itself to provide a plurality of superposed spiral laminations, the outer laminations being welded together by weld means extending longitudinally of the tubing, and inner laminations disposed radially within the weld means being free for relative sliding movement, said weld means including a filament of metal interposed between lapped portions of the laminations at the weld and welded thereto, and a substantially continuous layer of electrical insulating material interposed between and substantially co-extensive with the laminations and terminating in the vicinity of but spaced from said weld means.

4. A tubing structure as defined in claim 1, wherein additional weld means is provided extending longitudinally of the tubing between predetermined inner laminations, said weld means being independent from each other.

5. A tubing structure as defined in claim 2, wherein additional weld means is provided extending longitudinally of the tubing between predetermined inner laminations, said weld means being independent from each other.

6. A tubing structure as defined in claim 1, wherein the tubing is provided with convolutions along a predetermined portion of its length, to provide a flexible tubing structure.

7. The method of making a tubing structure which comprises wrapping a sheet upon itself to provide a plurality of superposed spiral laminations in tubing form, simultaneously arranging a layer of electrical insulating material between predetermined outer laminations, which layer of insulating material is interrupted at a location where a weld is to be formed, and electrical resistance welding a predetermined number of the outer laminations together by applying one electrode to an outwardly facing surface portion of an outermost lamination in general alignment with said location and applying another electrode to an outwardly facing portion of the tubing adjacent to but spaced from said location and providing a weld extending longitudinally of the tubing while leaving laminations disposed radially within the welded laminations free for relative sliding movement, and using the insulating layer to localize the weld.

8. The method of making a tubing structure which comprises wrapping a sheet upon itself to provide a plurality of superposed spiral laminations in tubing form, arranging a wire filament longitudinally of the tubing between predetermined lapped portions of outer laminations, and electrical resistance welding the laminations engaged by said wire together by applying means including an electrode contacting the outer surface of the outermost lamination portion adjacent said wire filament and providing a weld extending longitudinally of the tubing while leaving laminations disposed radially within the welded laminations free for relative sliding movement.

9. The method of making a tubing structure which comprises wrapping a sheet upon itself to provide a plurality of superposed spiral laminations in tubing form, arranging a wire filament between predetermined lapped portions of outer laminations extending longitudinally of the tubing, arranging a layer of electrical insulating material between said outer laminations in the vicinity of but spaced from said wire filament, and electrical resistance welding said outer laminations together by applying one electrode to the outer surface of the outermost lapped portion and a second electrode to an outwardly exposed surface portion of the tubing adjacent to but spaced from the wire filament and providing a weld extending longitudinally of the tubing while leaving laminations disposed radially within the welded laminations free for relative sliding movement, and while using the wire filament and insulating layer to localize the weld.

10. The method of making a tubing structure which comprises winding a portion of a sheet upon itself to shape the wound portion into tubing form, welding overlapped sections of said wound portion longitudinally of the formed tubing, and thereafter further wrapping the sheet upon itself to provide a plurality of superposed spiral laminations in tubing form, arranging a layer of electrical insulating material between predetermined outer laminations, and electrical resistance welding lapped portions of a predetermined number of the outermost laminations together by applying one electrode to an outwardly exposed surface of the outermost of said lapped portions and substantially in alignment with the weld being formed and applying another electrode to an outwardly exposed surface of the tubing adjacent to said lapped portions, moving relatively said electrodes longitudinally of the tubing, and providing a weld extending longitudinally of the tubing while leaving laminations disposed radially within the welded laminations free for relative sliding movement, and while using the insulating layer to localize the last named weld.

11. The method of making a tubing structure which comprises winding a portion of a sheet upon itself to shape the wound portion into tubing form, welding overlapped sections of said wound portion longitudinally of the formed tubing, and thereafter further wrapping the sheet upon itself to provide a plurality of superposed spiral laminations in tubing form, arranging a filament of wire between predetermined lapped portions of outer laminations, and electric resistance welding the lapped portions of the outer laminations engaged by the wire together by applying means including an electrode engaging the outwardly facing surface of the outermost lapped portion, and moving relatively said electrode longitudinally of the tubing, and providing a weld extending longitudinally of the tubing while leaving laminations disposed radially within the welded laminations free for relative sliding movement, and while using said wire filament to localize the weld.

12. The method of making a tubing structure as defined in claim 7, wherein a predetermined length of the tubing is corrugated after the welding operation, to provide a flexible convoluted tubing structure.

13. The method of making a tubing structure as defined in claim 8, wherein a predetermined length of the tubing is corrugated after the welding operation, to provide a flexible convoluted tubing structure.

14. A method of making a tubing structure, as defined in claim 8, which includes the step of forming an annular weld around one end portion of the tubing after the wire filament has been arranged between the lapped portions and before the longitudinally extending weld is formed to hold the laminations in wrapped relationship and to hold the wire filament in place.

References Cited in the file of this patent

UNITED STATES PATENTS

| | | |
|---|---|---|
| 686,558 | Thomson | Nov. 12, 1901 |
| 979,460 | Fulton | Dec. 27, 1910 |
| 1,869,351 | Lincoln | July 26, 1932 |
| 1,925,118 | Stresau | Sept. 5, 1933 |
| 2,331,504 | Raymond | Oct. 12, 1943 |
| 2,539,237 | Dreyer | Jan. 23, 1951 |
| 2,635,330 | Fentress | Apr. 21, 1953 |